United States Patent [19] [11] Patent Number: 4,566,062
Ohnishi et al. [45] Date of Patent: Jan. 21, 1986

[54] TIMING CONTROL SYSTEM IN DATA PROCESSOR

[75] Inventors: Katsumi Ohnishi; Yoshihiro Mizushima; Kiyosumi Sato, all of Kawasaki, Japan

[73] Assignee: Fujitsu Limited, Kawasaki, Japan

[21] Appl. No.: 508,503

[22] Filed: Jun. 28, 1983

[30] Foreign Application Priority Data

Jun. 28, 1982 [JP] Japan ................. 57-110971

[51] Int. Cl.⁴ .............................................. G06F 9/00
[52] U.S. Cl. ................... 364/200
[58] Field of Search ... 364/200 MS File, 900 MS File

[56] References Cited

U.S. PATENT DOCUMENTS 4,204,249  5/1980  Dye et al. ............................ 364/200
4,351,050  9/1982  Higashiyama ...................... 364/200
4,379,339  4/1983  Narita ................................. 364/900

Primary Examiner—Gareth D. Shaw
Assistant Examiner—John G. Mills
Attorney, Agent, or Firm—Staas & Halsey

[57] ABSTRACT

This invention relates to a timing control, for example, a control for reserving a waiting time when a data processor sends or receives data to or from an external device. Dummy cycles for a number of cycles having a processing time equal to the desired waiting time are generated by a dummy instruction. A timing control system is disclosed which is especially suitable for a micro-program system of a pipeline control system.

6 Claims, 3 Drawing Figures

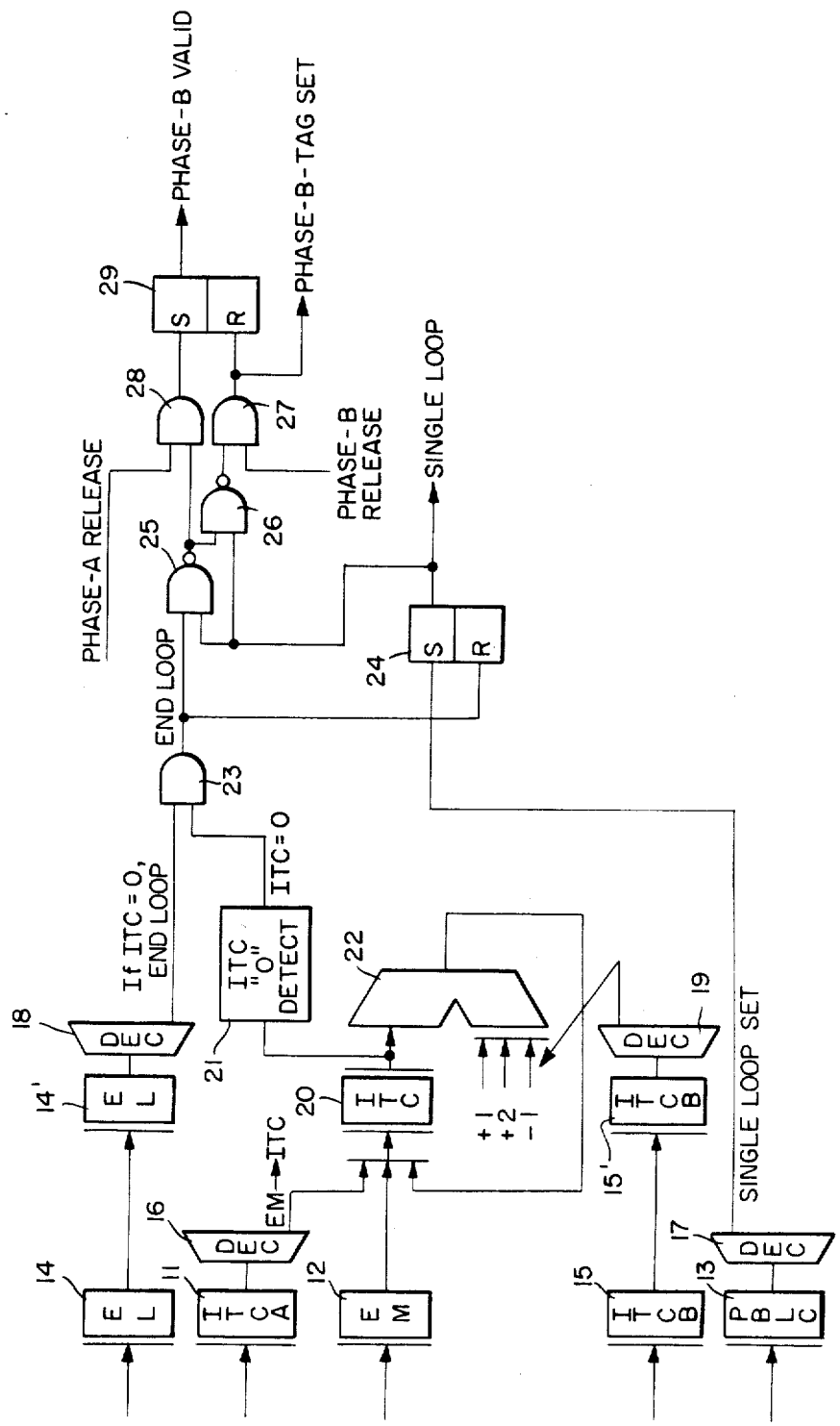

TIMING CONTROL SYSTEM IN DATA PROCESSOR

BACKGROUND OF THE INVENTION

This invention relates to a timing protection system for various control timings in a data processor, and more specifically to the realization of the timing function by the use of a dummy cycle executed by an instruction, particularly a micro-instruction.

In the case of processing machine instructions for external devices such as input/output units using microprograms, a first micro-instruction is executed for sending some data to the external devices and then a second micro-instruction is executed to process the response signal sent from such external devices.

The timing protection required for timing control of such external devices has been carried out using a timer or a complicated control circuit which confirms operation by exchanging response signals with the external devices, namely by an interlock system. In other words, such timing protection has required specially designed circuits or a complicated control system.

SUMMARY OF THE INVENTION

It is an object of the present invention to realize timing protection during execution of programs, particularly micro-programs without using a particular circuit, within an ordinary program or micro-program control circuit structure.

In order to attain such an object in a data processor, an instruction for executing a dummy cycle which is invalid for processing is inserted at the desired position in the program. In the above example, the instruction is inserted between the first and second micro-instructions for which timing protection is necessary. Within the instruction, the number of repetitions of the dummy cycle is designated and the protection time is a function of the product of the number of repetitions of the dummy cycle and the cycle time of the processor.

BRIEF DESCRIPTION OF THE DRAWINGS

FIG. 2 is a diagram of an embodiment of the present invention;

DESCRIPTION OF THE PREFERRED EMBODIMENT

This invention provides the desired timing protection during execution by inserting an instruction designating a dummy cycle at the position in the program requiring timing protection. The number of dummy cycles are controlled by the instruction. The embodiment indicated below is concerned with a microprogrammed processor using pipeline control. First, the basic operation of a micro-instruction in the pipeline control system will be explained.

Figure 1:
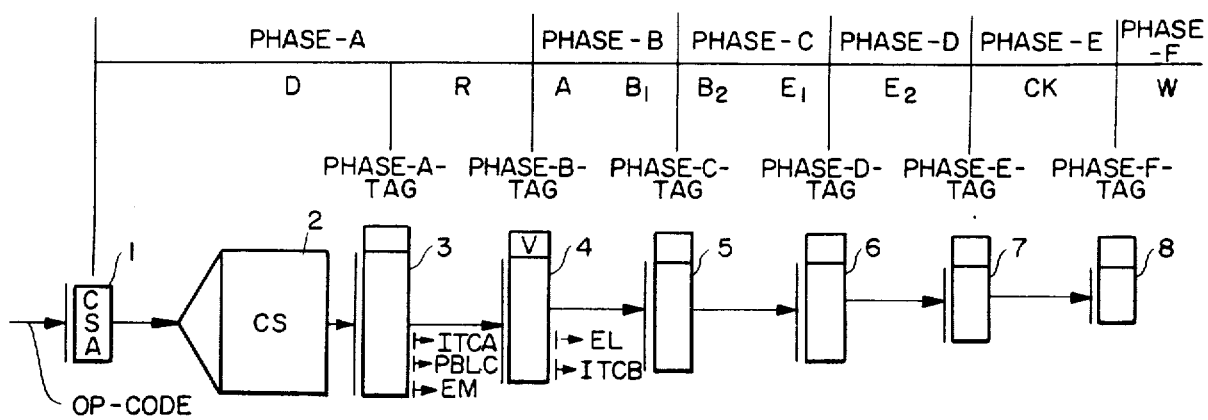
FIG. 1 is a block diagram of a pipeline-type microprogram control circuit to which the present invention is applied.

FIG. 1 illustrates the pipeline mechanism and the execution flow of micro-instructions. In this figure, block 1 is a central memory address register CSA and the OP code of a machine instruction is input to it as the address of control memory CS 2 in which micro-programs are stored. Blocks 3 to 8 are TAG registers of successive stages of a pipeline, corresponding to PHASE-A to PHASE-F of the execution flow indicated respectively to PHASE-A-TAG 3 to PHASE-F-TAG 8. The control bit of a micro-instruction read from the control memory CS 2 in the D cycle described later is synchronized with the pipeline and shifted from PHASE-A-TAG 3 to PHASE-F-TAG 8. The valid/invalid status of a TAG is indicated by the valid flag (V). Here, TAG indicates the control bits of the micro-instruction transmited in the TAG registers 3 to 8.

Processing of one micro-instruction is divided into the micro-operations of each cycle of D, R, A, $B_1$, $B_2$, $E_1$, $E_2$, CK and W. Each micro-operation is as follows.

(1) In the D cycle, the OP code of the machine instruction is decoded and the micro-instruction words are read from the control memory CS 2.

(2) In the R cycle, data for the registers used in address calculation are read on the basis of the micro-instruction words.

(3) In the A cycle, the address calculation is carried out.

(4) In the $B_1$ and $B_2$ cycles, desired operand data is read from a buffer memory.

(5) In the $E_1$ and $E_2$ cycles, the specified operations are executed.

(6) In the CK cycle, a data check is performed.

(7) In the W cycle, operation result data are written into registers. The contents of each TAG register are used as explained above for controlling hardware used for processing in each corresponding cycle, such as registers and operation units.

FIG. 2 is a block diagram of a hardware structure used for execution of a dummy cycle in this embodiment hereunder. This structure is connected to the pipeline control structure of FIG. 1. Of the micro-instruction words read from the control memory CS 2, the control fields called instruction TAG control phase-A (ITCA), execution mask EM, phase-B loop control (PBLC), end loop (EL) and iteration counter for phase-B (ITCB) are used in order to realize a dummy cycle. Functions of each field will be described later.

In FIG. 2, 11 is an ITCA register; 12 is an EM register; 13 is a PBLC register; 14 and 14' are end loop (EL) registers; and 15 and 15' are ITCB registers. Blocks 16 to 19 are decoders; 20 is an ITC register; 21 is ITC zero detection circuit; and 22 is an operation unit. Blocks 23, 27 and 28 are AND gates; 24 is a single loop latch; 25 and 26 are NAND gates; and 29 is a PHASE-B-VALID latch. The registers 11, 12, 13, 14 and 15 form a part of the PHASE-A-TAG register 3 of FIG. 1, while 14', 15' and 20 form a part of the PHASE-B-TAG register 4 of FIG. 1. The fields ITCA, EM and PBLC are read in PHASE-A from the corresponding registers 11, 12 and 13. Similarly, the EL and ITCB fields are read in PHASE-B from the registers 14 and 15.

A dummy cycle in this embodiment executes a loop for counting one by one the values present in the EM field in the ITC register 20. The time until ITC=0 is the protection or reserved time. The contents of the ITCA field in the ITCA register 11 are decoded in the decoder 16 at the end of PHASE-A and a control signal is output so that the value of the EM field is input to the ITC register 20 from the EM register 12. The value of the EM field in the EM register 12 determines the number of loops of the dummy cycle.

The contents of the PBLC field in the PBLC register 13 are decoded in the decoder 17 at the end of PHASE-A and a control signal is output so that the single loop latch 24 is set. The contents of the EL field in the EL register 14 are controlled in such a manner that the END LOOP signal is output from the AND gate 23 when the ITC zero detection circuit 21 has detected the All-"0" state of the contents of the ITC register 20. The contents of the ITCB field in the ITCB register 15' are decoded by the decoder 19 at the end of PHASE-B and a control signal is output so that the value obtained by substracting 1 from the value of the ITC register 20 is input to the ITC register 20.

When the single loop latch 24 is being set and the END LOOP is not ON, the PHASE-B valid flag is set again for each end of PHASE-A by the gates 25 and 28, but it is not reset even for the end of PHASE-B. In other words, the PHASE-B valid flag is kept ON. The output of AND gate 27 is used as a set enable signal to the PHASE-B-TAG register 4 and the contents of the PHASE-B-TAG register 4 are kept constant until this signal is generated when the END LOOP signal appears.

Figure 3:
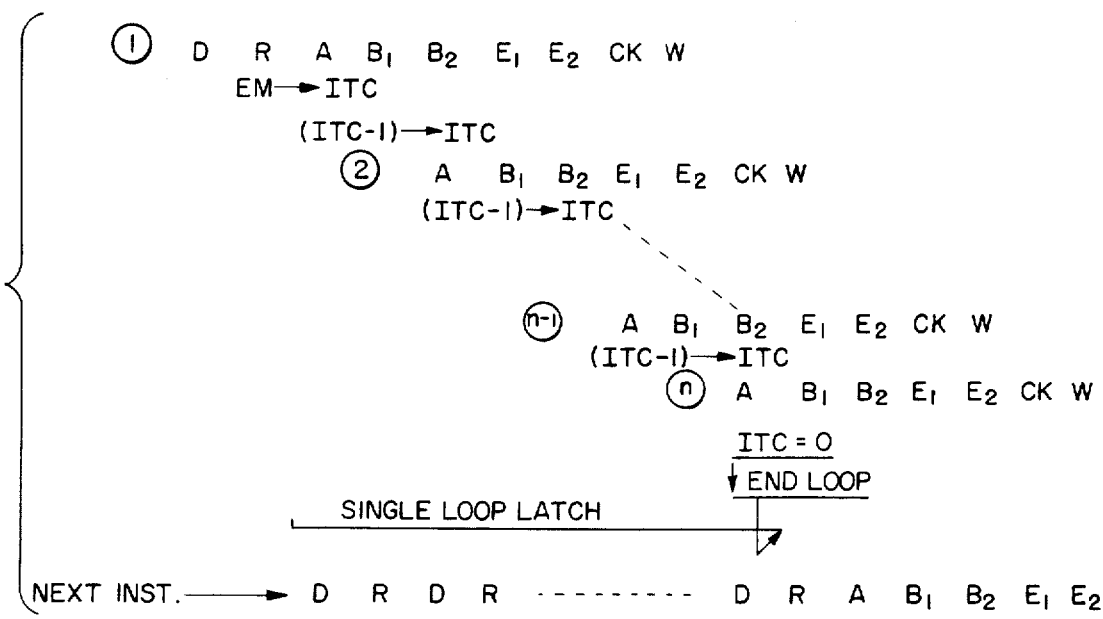
FIG. 3 is a time chart of an embodiment of the present invention.

The dummy cycle and the operation of FIG. 2 are explained with reference to the flow diagram of FIG. 3. In this figure, 1 to n indicate the execution loop of micro-instructions repeated in the dummy cycle. NEXT INST. indicates the execution of the next instruction is being delayed, i.e. time is being reserved, during the dummy cycle.

Flow 1:

At the end of PHASE-A, the value of EM is input (EM→ITC) into the ITC register 20 and the single loop latch 24 is set. At the end of PHASE-B (PHASE-B-RELEASE), it the single LOOP signal latch 24 is ON and the END loop is OFF, the valid flag (V) of PHASE-B is not reset. Therefore, operation of PHASE-B is executed again and the next instruction (NEXT INST.) is inhibitted from moving from PHASE-A to PHASE-B and is nullified. In addition, at the end of PHASE-B, operation (ITC-1)→ITC is executed.

Flow 2:

At the end of PHASE-B, (ITC-1)→ITC is executed. Since the contents of the ITC register 20 is not "0" and the single loop latch 24 is ON, the valid flag (V) of PHASE-B is still not reset and the next instruction (NEXT INST.) is inhibitted from moving to PHASE-B from PHASE-A. Thereafter, the flow 2 is repeated through the flow N−1.

Flow n:

Since the contents of ITC register 20 becomes "0" in PHASE-B, the END LOOP signal is generated by the AND gate 23 and thereby the output of gate 27 turns ON and simultaneously the single loop latch 24 is reset. When the single loop latch becomes OFF, the dummy cycle terminates and the next instruction (NEXT INST.) is allowed to move to PHASE-B from PHASE-A by the output of gate 27, PHASE-B-TAG SET signal.

As explained above, a time-out is generated for the period $(EM+1) \times 2 \times$ (machine cycle) when a a desirable value is present in the EM field and the timing is protected during such period. The method of realizing a dummy cycle is not restricted to precisely the above method and other adequate methods can also be obtained as required. According to this invention, a desired timing protection can be easily provided by inserting a single micro-instruction in an existing micro-program processor's control memory and providing the necessary control circuits.

What is claimed is:

1. A timing control system for a pipeline processor which executes micro-instructions including a dummy instruction having first and second control fields, comprising:

a pipeline processing control circuit comprising:

a first TAG register, operatively connected to the pipeline processor, receiving the micro-instructions, and having an instruction TAG control phase-A portion for holding the first control field and an execution mask portion for holding the second control field; and a second TAG register operatively connected to the pipeline processor and said first TAG register and having an instruction TAG control portion;

decoder means, operatively connected to the instruction TAG control phase-A portion of said first TAG register, for decoding the first control field and outputting an identifying signal when the dummy instruction is decoded;

counter means, operatively connected to the execution mask portion of said first TAG register, the instruction TAG control portion of said second TAG register and said decoder means, for receiving an initial value from the execution mask portion of said first TAG register, storing the initial value in the instruction TAG control portion of said second TAG register and decrementing the contents of the instruction TAG control portion of said second TAG register; and end detecting means, operatively connected to said first and second TAG registers, for outputting an end of processing signal indicating the end of the execution of the dummy instruction when the contents of the instruction TAG control portion of said second TAG register reaches zero.

2. A timing control system in a pipeline processor, as set forth in claim 1, wherein said first TAG register further comprises a phase-B loop control portion and said second TAG register further comprises an end loop portion, and wherein said end detecting means comprises:

a first decoder, operatively connected to the phase-B loop control portion of said first TAG register, for generating a single loop set signal;

a second decoder, operatively connected to the end loop portion of said second TAG register, for generating an end loop signal;

zero detecting means, operatively connected to the instruction TAG control portion of said second TAG register, for outputting a zero detected signal when the contents of the instruction TAG control portion equals zero;

an AND gate operatively connected to said second decoder and said zero detecting means;

a single loop latch circuit, operatively connected to said first decoder and said AND gate, receiving the single loop set signal as a set signal and the end loop signal as a reset signal;

a logic circuit operatively connected to said single loop latch circuit and said AND gate;

a flip-flop operatively connected to said logic circuit.

3. A method for providing a timing delay in a pipeline processor which executes instructions, using a single dummy instruction having first and second control fields, comprising the steps of:

(a) decoding the dummy instruction;

(b) executing an operation initiated by the dummy instruction repeatedly;

(c) counting during said executing step (b); and (d) terminating the timing delay when the amount counted in said counting step (c) is equal to a value represented by the contents of the second control field of the dummy instruction.

4. A method for counting time in a pipeline processor as set forth in claim 3, wherein the dummy instruction is a micro-instruction.

5. A method for counting time in a pipeline processor as set forth in claim 4, wherein said pipeline processor includes a pipeline control circuit having multiple stages for executing instructions and the second control field represents a number of executions of the dummy instruction, and wherein said executing step (b) comprises the step of executing an operation initiated by the dummy instruction repeatedly in the same stage of the pipeline control circuit and said counting step (c) comprises the step of counting once for each occurrence of said executing in step (b).

6. A method for counting time in a pipeline processor as set forth in claim 4, wherein the contents of the second control field of the dummy instruction represents a number of machine cycles and said counting step (c) comprises the step of counting machine cycles.

* * * * *